Patented Mar. 17, 1936

2,034,303

UNITED STATES PATENT OFFICE 2,034,303

AZO DYESTUFFS AND THEIR PRODUCTION

Hans Krzikalla, Ludwigshafen-on-the-Rhine, and Bernd Eistert, Mannheim, Germany, assignors to General Aniline Works, Inc., New York, N. Y., a corporation of Delaware No Drawing. Application March 3, 1934, Serial No. 713,947. In Germany March 10, 1933

4 Claims. (Cl. 260—86)

The present invention relates to new azo dyestuffs and a process of producing same.

We have found that valuable azo dyestuffs are obtained by coupling diazotized compounds with compounds containing the ring system

i. e. the ring system of the so-called "pyronone".

Compounds of this kind are for example the 6-alkyl- or 6-cycloalkyl- or 6-aryl- or 6-aralkyl-pyronones, the 5,6-benzo- or 5,6-naphtho condensed pyronones, such as

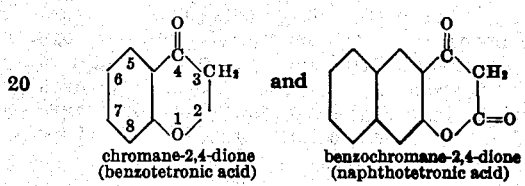

chromane-2,4-dione (benzotetronic acid)

benzochromane-2,4-dione (naphthotetronic acid)

as well as their substitution products, such as alkyl, halogen and nitro derivatives.

The monoazo dyestuffs obtainable from these coupling components with the aid of diazo compounds are usually yellow to red. As diazo compounds may be mentioned the diazotized (or tetrazotized) mono- and poly-amines of the benzene, napthalene, anthracene, diphenyl series including their homologues and their derivatives, for example those substituted by halogen, especially chlorine, nitro, hydroxy, methoxy, carboxylic and/or sulphonic acid groups; diazotized aminoazo compounds may also be employed. Mono-, dis- and polyazo dyestuffs may be prepared according to the present invention; in the case of disazo dyestuffs one molecule of a suitable tetrazo compound may be coupled with two molecules of equal or different coupling compounds of the kind defined above or with one molecule of such a compound and one molecule of any other compound capable of coupling.

On the one hand ready-made dyestuffs may be produced according to the present invention by coupling the diazo or tetrazo compounds with the coupling components. The dyestuffs thus obtainable may be used for different purposes, those containing sulphonic acid groups for example for dyeing wool, silk, leather and in some cases cotton. Those dyestuffs which are free from sulphonic acid groups, may be employed for dyeing acetate artificial silk; some of them, for example those containing nitro groups and/or halogen are valuable pigments while others, for example those free from such substituents may be employed with advantage for coloring waxes and oils.

Moreover it is possible to produce the dyestuffs free from sulphonic groups in the presence of the fibres to be dyed, i. e. they may be prepared in the manner usual with development dyestuffs. For example cotton may be impregnated with a coupling compound of the kind defined above and then developed in a bath containing a suitable diazo compound, or acetate artificial silk may be first treated with a diazotizable amine, diazotized on the fibre and subsequently developed by means of a compound containing the "pyronone" ring system as indicated above.

By employing ortho-hydroxy- or ortho-alkoxy-amines as diazo components, yellow to brown dyestuffs are obtained which may be converted into complex metal compounds by treatment with agents supplying metals, such as chromium, cobalt or copper compounds, in substance or on the fibre; in the case of alkoxy compounds the said treatment is carried out under conditions under which the alkyl group is split off.

Generally speaking, the dyestuffs have a good fastness to light and are distinguished, in so far as they are sufficiently soluble in water, by an excellent levelling power and in many cases an excellent fastness to washing.

The following examples will further illustrate the nature of this invention but the invention is not restricted to these examples. The parts are by weight.

Example 1

95 parts of aniline are diazotized in the usual manner and the solution of the diazo compound is added while stirring to a solution, containing an excess of soda, of 140 parts of 6-methyl-pyronone (cf. Journal of the Chemical Society, London, 1891, part I, page 608). A pale yellow dyestuff somewhat soluble in water is obtained which may serve for the dyeing of lacquer, wax preparations or oils.

Similar dyestuffs, in part more reddish, are obtained by employing toluidines, xylidines, naphthylamines or amianoazo benzene as diazo components or replacing the 6-methylpyronone by benzotetronic acid (cf. Annalen der Chemie, vol. 367, page 196).

Instead of 6-methyl-pyronone in the present example and in the following ones pyronones may be used as coupling components which contain in the 6-position an aryl or arlkyl radicle such as 6-phenylpyronone (obtainable by heating dehydrobenzoyl acetic acid (cf. Berichte der Deutschen Chem. Gesellschaft vol. 23, page 3727) in 90 per cent sulphuric acid at 135° C.) or 6-benzylpyronone (obtainable in an analogous manner from dehydrophenacetyl acetic acid (obtainable by condensation of 2 molecular proportions of γ-phenyl acetyl acetic acid ester)).

Example 2

174 parts of 1-methoxy-2-amino-5-nitrobenzene are diazotized in the usual manner and the solution of the diazo compound is introduced while stirring into a solution of 140 parts of 6-methylpyronone containing an excess of soda. The resulting orange-yellow dyestuff may be employed for dyeing acetate silk or as a pigment for the lacquer industry. The dyeings have a good fastness to light.

Similar dyestuffs are obtained by employing diazotized nitranilines and nitroluidines.

Example 3

140 parts of para-nitraniline are diazotized in the usual manner and the resulting diazo compound is coupled with 225 parts of naphthotetronic acid (cf. Annalen der Chemie, 367, page 262) dissolved in an aqueous solution of soda. An orange-yellow pigment dyestuff is obtained. Similar dyestuffs can be obtained with 6- or 7-methylbenzotetronic acid (ibid. page 236 or 251). Other nitranilines, or nitroluidine or chloronitranilines may be employed as diazo components instead of paranitraniline.

Example 4

220 parts of 1-methyl-3-amino-6-chlorbenzene-4-sulphonic acid are diazotized in the usual manner and the resulting diazo solution is coupled with 140 parts of 6-methylpyronone dissolved in a sufficient amount of soda solution. After salting out with common salt, a yellow dyestuff is obtained which dyes wool beautiful brilliant yellow and very level shades which are eminently fast to washing and fulling. The resulting dyestuff may be laked in the usual manner, for example, with barium salts while adding aluminium sulphate and soda, a beautiful yellow pigment being thus obtained.

Similar dyestuffs may be obtained by employing other aromatic amino sulphonic acids or sulphonated aminoazo compounds as diazo components or by using as coupling components benzo- or naphthotetronic acid or 7,8-benzochromane-2,4-dione (obtainable from 1-hydroxynaphthalene-2-carboxylic acid in a manner analogous to that stated in Annalen der Chemie, vol. 367, page 262, instead of 6-methylpyronone.

Example 5

450 parts of 1,4'-diamino-3,3'-dimethoxydiphenyl-6,6'-disulphonic acid sodium salt are tetrazotized and the resulting tetrazo compound is coupled with 280 parts of 6-methylpyronone in a solution rendered alkaline with soda. The resulting orange-red disazo dyestuff may be separated by salting out with common salt and may be employed for dyeing silk.

Example 6

267 parts of 1-amino-2-methoxynaphthalene-6-sulphonic acid are diazotized and the resulting diazo compound is coupled with 140 parts of 6-methylpyronone in a solution rendered alkaline with soda. The dyestuff may be separated by salting out and yields orange dyeings on wool.

If the dyestuff be treated in the usual manner with agents supplying chromium, as for example chromium formate, under conditions under which a splitting off of the methyl radicle takes place, (for example, by heating in a sealed vessel at between 110° and 130° C.) a dyestuff containing chromium is obtained which yields very level Bordeaux red dyeings on wool.

Example 7

388 parts of 4,4'-diaminodiphenyl-3,3'-disulphonic acid sodium salt are tetrazotized and coupled with 500 parts of naphthotetronic acid while alkaline with soda. The dyestuff dyes cotton orange-red shades.

The dyestuff obtainable in an analogous manner by coupling tetrazotized 4,4'-diaminostilbene-3,3'-disulphonic acid with naphthotetronic acid yields a red-brown dyeing on cotton.

Example 8

250 parts of the diazo compound of 1-amino-2-hydroxynaphthalene-4-sulphonic acid are made into a paste with a little ice-cold water and stirred into a solution of 140 parts of 6-methylpyronone in 850 parts of pyridine. The whole is stirred at from 30° to 40° C. until the coupling is completed and then it is acidified with hydrochloric acid. The resulting dyestuff dyes wool very uniform red-brown shades; the dyeing becomes a fast blue-red by aftertreatment with bichromate.

The dyestuff may also be converted in substance into the complex chromium compound by treatment with chromium formate or the like; the dyestuff is then suitable for dyeing animal fibre.

The dyestuff prepared in a corresponding manner from the diazo compound of 1-amino-2-hydroxy-6-nitronaphthalene-4-sulphonic acid and 6-methylpyronone dyes wool very uniform dark brown shades and the chromium compound prepared therefrom in substance or on the fibre yields pale red-brown shades.

Example 9

226 parts of 1-hydroxy-2-amino-4-chlorbenzene-6-sulphonic acid are diazotized and coupled with 135 parts of 6-methylpyronone in a solution rendered alkaline with soda. The dyestuff dyes wool very uniform yellow-brown shades; the chromium compound prepared by afterchroming on the fibre or by chroming in substance yields very uniform red-brown shades.

The dyestuff from diazotized 1-hydroxy-2-amino-4-nitrobenzene-6-sulphonic acid and 6-methylpyronone yields very uniform red-brown shades on wool; its chromium compound yields yellow-brown shades.

The dyestuffs may also be employed for dyeing leather and silk.

Example 10

Acetate silk is dyed in the usual manner with 1 per cent of aminoazotoluene. It is diazotized on the fibre and developed with a weak alkaline solution of 6-methylpyronone, and red-orange shades eminently fast to washing and of a good fastness to light are obtained.

If acetate silk dyed with aminoazobenzene or para-aminophenylazo-alpha-naphthylamine be diazotized in the same manner, yellow-orange or violet shades are obtained by development with 6-methylpyronone.

Example 11

244 parts of ortho-dianisidine are tetrazotized in the usual manner with sodium nitrite and hydrochloric acid and the resulting tetrazo solution is added to a solution of 246 parts of 2-hydroxynaphthalene-6-sulphonic acid sodium salt in an amount of soda solution sufficient to neutralize the hydrochlorid acid. As soon as the formation of the monoazo dyestuff is completed, a solution of 135 parts of 6-methylpyronone in caustic soda is added. When coupling is completed, the dyestuff is salted out. It dyes cotton violet-blue shades; by aftertreatment with copper sulphate the shade of color becomes somewhat more reddish.

Example 12

Cotton yarn is impregnated with a solution containing per liter 5 grams of naphthotetronic acid, 10 cubic centimeters of caustic soda solution of 34° Bé. strength, 10 cubic centimeters of Turkey red oil and 30 grams of Glauber's salt. The rope is vigorously squeezed and handled in a solution containing per liter the diazo compound of 2 grams of 1-amino-4-nitrobenzene which has been neutralized by means of sodium acetate. Dyeings of orange yellow shades are obtained.

Instead of naphthotetronic acid the isomeric 7.8-benzochromane-2.4-dione (see Example 4) may be used whereby usually dyeings of somewhat more reddish shades are obtained.

Example 13

234 parts of 1-amino-2-hydroxy-3-nitrobenzene-5-sulphonic acid are diazotized in the usual manner and allowed to flow into a solution of 212 parts of naphthotetronic acid rendered alkaline by means of sodium carbonate, while stirring. A dyestuff is obtained giving level violet shades on wool which upon treatment with bichromate change into a brilliant Bordeaux.

If the isomeric 1-amino-2-hydroxy-5-nitrobenzene-3-sulphonic acid is used as diazo component a red violet dyestuff is obtained which by afterchroming yields a beautiful red.

By treating the dyestuffs with agents supplying chromium, for example by heating them for 2 hours with a solution of chromium formate, they may be converted into dyestuffs containing chromium which are suitable for dyeing wool, leather or silk thus yielding shades corresponding to those obtainable by afterchroming.

What we claim is:—

1. The process of producing azo dyestuffs which comprises coupling a diazotized compound with a compound corresponding to the formula

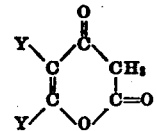

wherein the two Y's stand for members of a condensed aromatic ring system.

2. The process of producing azo dyestuffs which comprises coupling a diazotized compound with a compound corresponding to the formula

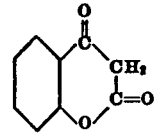

3. The process of producing azo dyestuffs which comprises coupling a diazotized compound with a compound corresponding to the formula

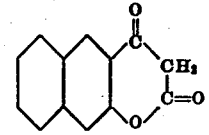

4. Azo dyestuffs derived from a coupling component which corresponds to the formula

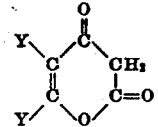

wherein the two Y's stand for the members of a condensed aromatic ring system.

HANS KRZIKALLA.
BERND EISTERT.

Certificate of Correction

Patent No. 2,034,303.    March 17, 1936.

HANS KRZIKALLA ET AL.

It is hereby certified that error appears in the printed specification of the above numbered patent requiring correction as follows: Page 1, first column, line 20, in the formula, for

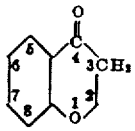

read

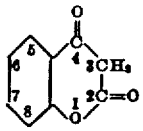

and that the said Letters Patent should be read with this correction therein that the same may conform to the record of the case in the Patent Office.

Signed and sealed this 1st day of September, A. D. 1936.

[SEAL]

LESLIE FRAZER,
*Acting Commissioner of Patents.*